Aug. 16, 1966 K. J. POFERL 3,266,623
SECTIONAL CONTAINER
Filed June 22, 1964 2 Sheets-Sheet 1
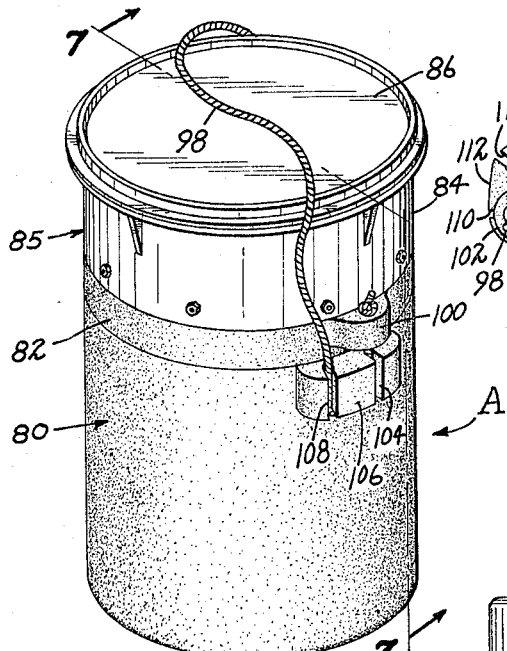
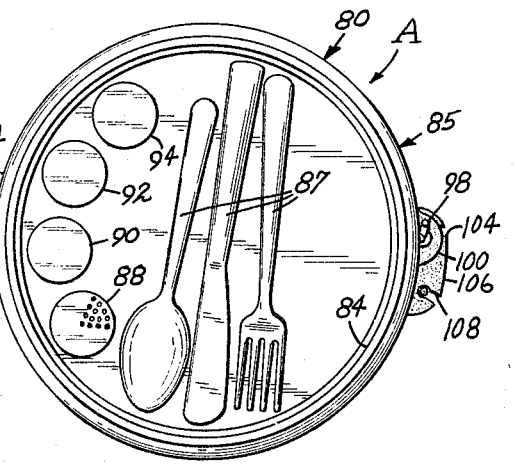
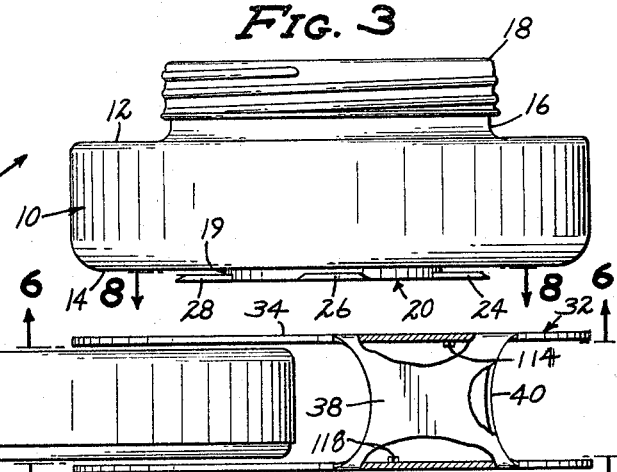
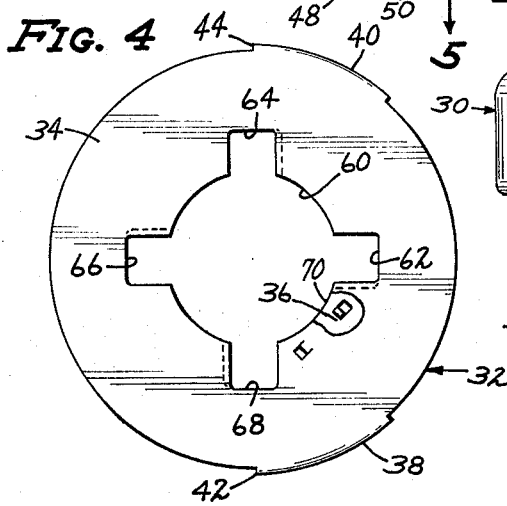
INVENTOR
KENNETH J. POFERL
BY
Caswell, Lagaard & Wicks
ATTORNEYS Aug. 16, 1966  K. J. POFERL  3,266,623
SECTIONAL CONTAINER
Filed June 22, 1964  2 Sheets-Sheet 2
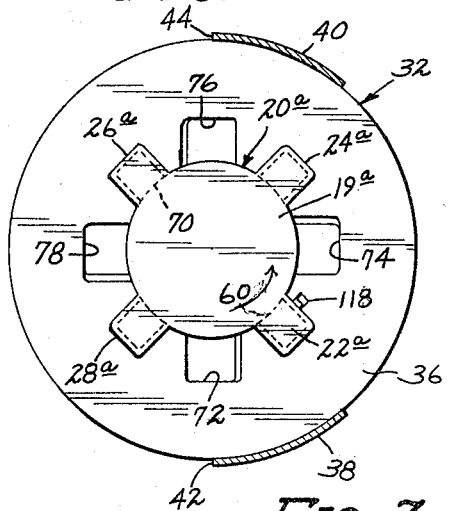
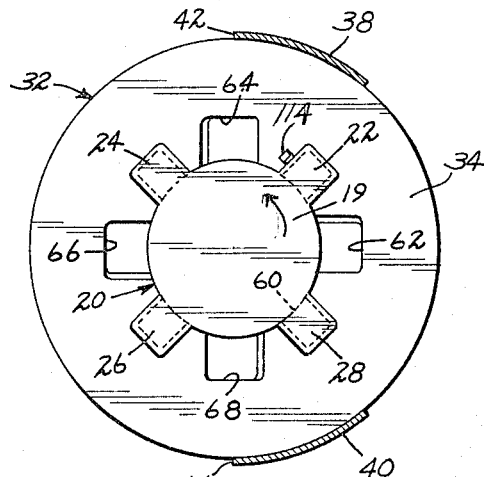
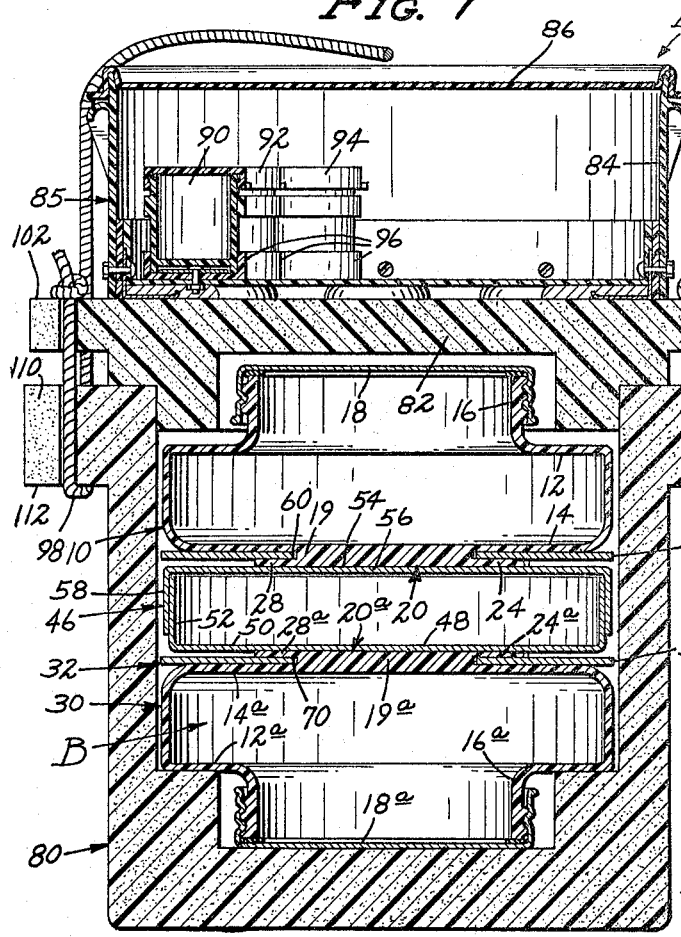
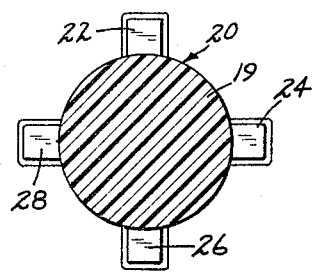
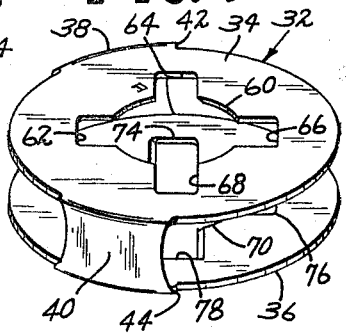
INVENTOR
KENNETH J. POFERL
BY
Caswell, Lagaard & Wicks
ATTORNEYS

United States Patent Office 3,266,623
Patented August 16, 1966

3,266,623
SECTIONAL CONTAINER
Kenneth J. Poferl, 621 E. Superior St., Duluth, Minn.
Filed June 22, 1964, Ser. No. 376,668
7 Claims. (Cl. 206—4)

The invention relates to an improvement in containers for food and liquids and more particularly to a container having a plurality of food or liquid holding containers, the containers being joinable as a unit and the unit placed within an insulated container.

It is an object of the invention to provide a plurality of containers, each of which is adapted to contain food or liquid, the containers having means for mounting the same together to form a unit. The containers enable the user to carry a full meal of different hot foods and beverage after the same have been prepared.

It is a further object to provide an intermediate mounting unit which holds the central container and which releasably mounts the upper and lower containers.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the entire container.

FIGURE 2 is a top plan view of the container with the top removed.

FIGURE 3 is an exploded side elevational view of the upper container, the intermediate mounting member, the intermediate container partially removed from the intermediate mounting member and the lower container.

FIGURE 4 is a top plan view of the intermediate container mounting member.

FIGURE 5 is a sectional view on the line 5—5 of FIGURE 3.

FIGURE 6 is a sectional view on the line 6—6 of FIGURE 3.

FIGURE 7 is a sectional view through the entire container on the line 7—7 of FIGURE 1.

FIGURE 8 is a sectional view on the line 8—8 of FIGURE 3.

FIGURE 9 is a perspective view of the intermediate support member.

Referring in detail to the drawings, the sectional container A includes the internal unit B including the upper circular container 10 having a top 12 and a bottom 14. The top 12 is formed with the threaded neck portion 16 to which is screwed the threaded cap 18. Secured to and spaced from the bottom 14 by means of the axial base 19 is the axially mounted quadruple bayonet member 20 having the four blade portions 22, 24, 26 and 28.

Further provided is the lower circular container 30 which is identical to the upper container 10 and in this regard the corresponding portions are numbered identical as those with regard to container 10 except that with regard to container 30 the number is followed by the small letter *a*.

The numeral 32 designates an intermediate support member which includes the upper circular plate portion 34 and the lower circular plate portion 36. The plate portions 34 and 36 are secured in spaced relation by means of the vertical supports 38 and 40. The vertical support portions 38 and 40 are so positioned on the periphery of the upper and lower circular plate portions 34 and 36, respectively, that the edges 42 and 44 thereof are on a diameter of the plate portions 34 and 36. As a result, the intermediate circular container 46 can be slipped between the circular plate portions 34 and 36 and just bypass the vertical edges 42 and 44 of the supports 38 and 40. The intermediate circular container 46 is maintained in position axially of the circular plates 34 and 36 by the same abutting the vertical supports 38 and 40.

The intermediate circular container 46 is composed of the lower, circular, dish-like portion 48 formed of the circular bottom wall 50 and the annular peripheral upstanding wall 52. The intermediate circular container 46 further includes the cover 54 which includes the circular top 56 and the annular peripheral wall 58 depending therefrom. The diameters of the annular walls 52 and 58 are such that the lower dish-like portion 48 fits snugly within the upper cover 54. The vertical dimension of the intermediate circular container 46 is such that it will slip between the circular plate portions 34 and 36 of the intermediate support member 32. The upper and lower circular plate portions 34 and 36 of the intermediate support 32 are identical. The upper circular plate portion 34 has formed therein an axial circular opening 60 from which emanates the radially extending female bayonet slots 62, 64, 66 and 68, particularly FIGURE 6.

The lower circular plate portion 36 of the intermediate support 32 is formed with the axial circular opening 70 and emanating therefrom are the radially extending female bayonet slots 72, 74, 76 and 78, particularly FIGURE 5. The upper circular container 10 is secured to the top circular plate 34 of the intermediate support 32 by positioning the bayonet blade portions 22, 24, 26 and 28 within the slots 62, 64, 66 and 68, respectively, and turning the container 10 approximately 45° to thereby place the blade portions 22, 24, 26 and 28 out of register with the female bayonet slots 62, 64, 66 and 68, respectively, as indicated by the arrow and particularly shown in FIGURE 6. The lower circular container 30 is secured to the circular plate 36 of the intermediate support 32 by placing the bayonet blades 22a, 24a, 26a and 28a in the slots 72, 74, 76 and 78, respectively, and rotating the container 30 approximately 45° to thereby move the bayonet blades out of register with the female bayonet slots as indicated by the arrow and particularly shown in FIGURE 5. We thus have the upper circular container 10 secured to the intermediate support 32 and the circular container 30 also secured to the intermediate support 32. The intermediate circular container 46 is positioned within the intermediate support 32 as heretofore set forth. The interlocking of the bayonet blade portions of the upper and lower containers 10 and 30, respectively, with the female slots formed in the upper and lower plate portions 34 and 36, respectively, of the intermediate support 32 is further illustrated in FIGURE 7.

A hot beverage, such as hot coffee, may be placed in the upper container 10 while hot soup may be placed in the lower container 30. In addition, a piece of hot meat or hot means may be placed in the intermediate circular container 46 thus providing more or less of an entire meal held together as one unit. The contents of the containers of the internal unit B are maintained warm by placing the unit B in the insulated main container 80 sealed off at the top thereof by means of the lid 82. The lid 82 has mounted on the top thereof the annular wall 84 closed off by the top member 86 which forms a container 85. Small containers such as 88, 90, 92 and 94 are mounted in a series of base members 96 and these containers may contain salt, sugar, mustard, ketchup, etc. The remainder of the space in the top outer container 85 may accommodate bread, cake, cookies and the like and/or utensils such as 87.

The lid 82 is secured to the main container 80 by means of the handle cord 98 secured at one end to the lug formation 100 of the lid 82 and at the other end to the lug formation 102 also of the lid 82. The cord 98 is then positioned downwardly in the open slot 104 of the lug 106 and up through open slot 108 of lug 106 to thereby lock the cord. The other end of the cord 98 is then positioned downwardly through the open slot 110 of lug 112 and upwardly through the open slot 114 identical to slot 108 of lug 106.

The underside of the upper circular plate portion 34 is formed with a stop lug 116 against which the blade portion 22 abuts after being inserted in the opening 62 and rotated. Similarly the upper side of the lower circular plate portion 36 is formed with a stop lug 118 against which the blade portion 22a abuts after being inserted in the opening 72 and rotated.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A sectional container comprising in combination:
 (a) an internal unit including
 (b) an intermediate support member including
 (c) an upper circular plate,
 (d) a lower circular plate,
 (e) means connecting said upper circular plate to said lower circular plate in spaced relation,
 (f) said upper circular plate having an axial opening formed therein and
 (g) one or more slots extending radially from said axial opening of said upper circular plate,
 (h) said lower circular plate having an axial opening formed therein and
 (i) one or more slots extending radially from said axial opening of said lower circular plate,
 (j) an upper circular container having
 (k) one or more blade portions secured to and spaced from the bottom thereof in radial formation said blade portions insertable through said radial slots of said upper circular plate for engagement with said upper circular plate to thereby mount said upper container on said upper circular plate,
 (l) a lower circular container having,
 (m) one or more blade portions secured to and spaced from the bottom thereof in radial formation and insertable through said radial slots of said lower circular plate for engagement with said lower circular plate to thereby mount said lower container on said lower circular plate,
 (n) an intermediate circular container insertable between said upper and lower circular plates of said intermediate support member,
 (o) an insulated container and
 (p) means for enclosing said internal unit within said insulated container.

2. An internal sectional unit for an insulated container comprising in combination:
 (a) an intermediate support member including
 (b) an upper circular plate,
 (c) a lower circular plate,
 (d) means connecting said upper circular plate to said lower circular plate in spaced relation,
 (e) said upper circular plate having an axial opening formed therein and
 (f) one or more slots extending radially from said axial opening of said upper circular plate,
 (g) said lower circular plate having an axial opening formed therein and
 (h) one or more slots extending radially from said axial opening of said lower circular plate,
 (i) an upper circular container having
 (j) one or more blade portions secured to and spaced from the bottom thereof in radial formation said blade portions insertable through said radial slots of said upper circular plate for engagement with said upper circular plate to thereby mount said upper container on said upper circular plate,
 (k) a lower circular container having,
 (l) one or more blade portions secured to and spaced from the bottom thereof in radial formation and insertable through said radial slots of said lower circular plate for engagement with said lower circular plate to thereby mount said lower container on said lower circular plate, and
 (m) an intermediate circular container insertable between said upper and lower circular plates of said intermediate support member.

3. A sectional container comprising in combination:
 (a) an internal unit including
 (b) an intermediate support member including
 (c) an upper circular plate,
 (d) a lower circular plate,
 (e) means connecting said upper circular plate to said lower circular plate in spaced relation,
 (f) an upper circular container,
 (g) a lower circular container,
 (h) an intermediate circular container insertable between said upper and lower circular plates,
 (i) means for removably securing said upper circular container to said upper circular plate,
 (j) means for removably securing said lower circular container to said lower circular plate,
 (k) an insulated container and
 (l) means for enclosing said internal unit within said insulated container.

4. An internal sectional unit for an insulated container comprising in combination:
 (a) an intermediate support member including
 (b) an upper circular plate,
 (c) a lower circular plate,
 (d) means connecting said upper circular plate to said lower circular plate in spaced relation,
 (e) said connecting means having a void therein,
 (f) an upper circular container,
 (g) a lower circular container,
 (h) an intermediate circular container insertable through said void to a position between said upper and lower circular plates,
 (i) means for removably securing said upper circular container to said upper circular plate,
 (j) means for removably securing said lower circular container to said lower circular plate.

5. A sectional container comprising in combination:
 (a) an internal unit including
 (b) an intermediate support member including
 (c) an upper plate,
 (d) a lower plate,
 (e) means connecting said upper plate to said lower plate,
 (f) said upper plate having an opening formed therein and
 (g) one or more slots extending from said opening of said upper plate,
 (h) said lower plate having an opening formed therein,
 (i) one or more slots extending from said opening of said upper plate,
 (j) an upper container having
 (k) one or more blade portions secured to and spaced from the bottom thereof, said blade portions insertable through said slots of said upper plate for engagement with said upper plate to thereby mount said upper container on said upper plate,
 (l) a lower container having
 (m) one or more blade portions secured to and spaced from the bottom thereof in radial formation and insertable through said slots of said lower plate for engagement with said lower plate to thereby mount said lower container on said lower circular plate, (n) an intermediate circular container insertable between said upper and lower plates of said intermediate support member,
(o) an insulated container and
(p) means for enclosing said internal unit within said insulated container.

6. The device of claim 1 further characterized by a container for food, utensils and the like mounted on said insulated container.

7. An internal sectional container unit for an insulated container comprising:
   (a) an intermediate support member including
   (b) an upper plate,
   (c) a lower plate,
   (d) means connecting said upper plate to said lower plate in spaced relation,
   (e) said connecting means having a void therein,
   (f) an upper container,
   (g) a lower container,
   (h) an intermediate container insertable through said void to a position between said upper and lower plates,
   (i) means for removably securing said upper container to said upper plate, and
   (j) means for removably securing said lower container to said lower plate.

References Cited by the Examiner

UNITED STATES PATENTS

| | | | |
|---|---|---|---|
| 1,280,918 | 10/1918 | Westbrook | 220—22 |
| 1,739,425 | 12/1929 | Stefan | 206—4 |
| 2,196,689 | 4/1940 | Wolf | 220—22 |
| 2,405,764 | 8/1946 | Smith | 206—4 |
| 2,511,066 | 6/1950 | Jacobowitz | 211—50 |

FOREIGN PATENTS 24,332    1902    Great Britain.

THERON E. CONDON, *Primary Examiner.*

W. T. DIXSON, *Assistant Examiner.*